United States Patent [19]

Blankenship

[11] Patent Number: 4,905,324
[45] Date of Patent: Mar. 6, 1990

[54] HEAT CONDUCTING INSERT FOR ASH PAN FOR INCINERATOR TOILET

[75] Inventor: Ernest B. Blankenship, Dallas, Tex.

[73] Assignee: Research Products/Blankenship Corporation, Dallas, Tex.

[21] Appl. No.: 160,824

[22] Filed: Feb. 26, 1988

[51] Int. Cl.⁴ ............................................. A47K 11/02
[52] U.S. Cl. .................. 4/111.5; 4/DIG. 17; 220/468; 220/408
[58] Field of Search ............ 4/DIG. 17, 111.1, 111.2, 4/111.3, 111.4, 111.5, 111.6; 110/166; 126/243; 220/405, 468, 408; 219/260, 267; 99/419, 482, 446

[56] References Cited

U.S. PATENT DOCUMENTS

| | | | |
|---|---|---|---|
| 1,267,262 | 5/1918 | Patton | 220/405 X |
| 1,707,655 | 4/1929 | Cohn | 220/468 |
| 2,174,425 | 9/1939 | Schlumbohm | 220/405 X |
| 2,545,528 | 3/1951 | Murray | 220/408 X |
| 3,169,497 | 2/1965 | Blankenship | 4/111.2 |
| 3,890,653 | 6/1975 | Blankenship | 4/111.5 |
| 3,890,654 | 6/1975 | Blankenship | 4/111.3 |
| 4,714,012 | 12/1987 | Hernandez | 99/410 X |
| 4,763,640 | 8/1988 | Schnack | 126/243 |

Primary Examiner—Harvey C. Hornsby
Assistant Examiner—K. O'Leary
Attorney, Agent, or Firm—Arthur F. Zobal

[57] ABSTRACT

The ash pan is a composite ash pan and includes an outer pan formed of stainless steel and an inner pan, formed of aluminum, adapted to be removably inserted into the outer pan. The inner pan has a raised central portion for separating and supporting the solid waste from the liquid waste. In the preferred embodiment, the raised central portion extends up to a height about equal to that of the height of the surrounding wall of the inner pan and the height of the surrounding wall of the inner pan is nearly equal to the height of the surrounding wall of the outer pan.

6 Claims, 5 Drawing Sheets

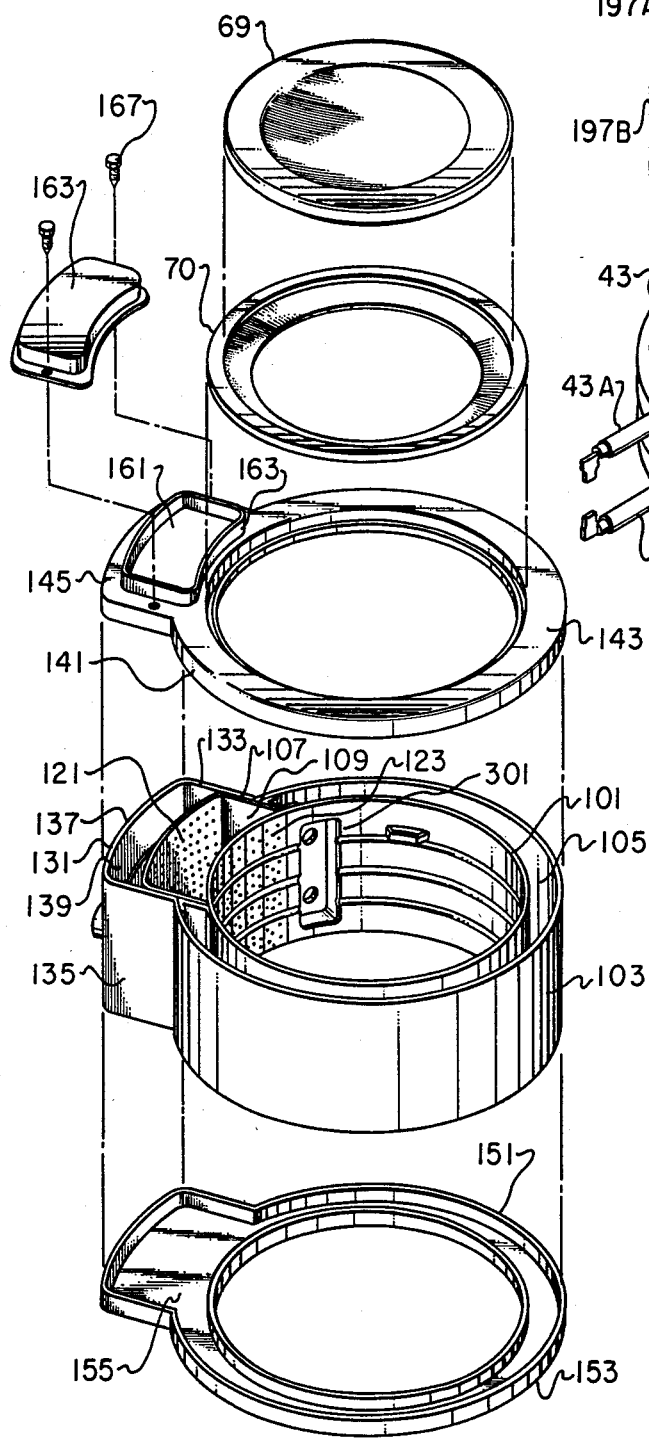
Fig. 2
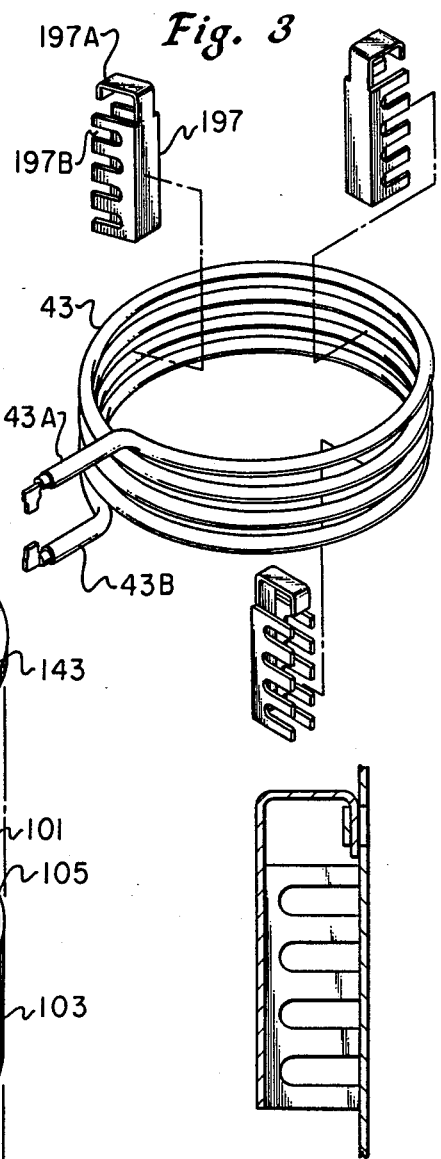
Fig. 3
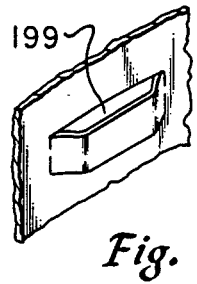
Fig. 6
Fig. 5

4,905,324

HEAT CONDUCTING INSERT FOR ASH PAN FOR INCINERATOR TOILET

BACKGROUND OF THE INVENTION

Incinerator toilets apply heat to human waste, thereby evaporating urine, and dehydrating and oxidizing (burning) the dried residue to an ash which is accumulated in an ash pan and on occasions removed for disposal elsewhere. A removable ash pan is desirable for convenience. Such an ash pan must be sturdily constructed to withstand the rigors of handling, banging, and emptying and be of a material to provide such construction. If the ash pan also forms an integral part of the incinerator chamber, i.e., containing the deposited waste during actual incineration, it is also subjected to intense heat and may be deformed and chemically attacked.

If the ash pan is located beneath the source of heat as in the case of a radiant electric heater being supported above the waste, heat is transferred into the waste by direct radiation and by conduction of heat through the material composing the ash pan. If conductance of the material is low, then efficiency of the heat transfer process is greatly impaired, thereby extending the time of incineration which, in turn, limits the rate of usage of the toilet as well as increasing the amount of energy used as well as the cost of operation.

Regarding human waste as a mix of liquid waste and solid waste, considerable improvement in the rate of incineration can be had by separating the liquid from the solid and applying heat to both phases simultaneously; otherwise, the liquid waste must first be evaporated, then the solid waste dehydrated, then elevated in temperature to the point of ignition. Obviously, if all three actions can proceed simultaneously, substantial savings in time and energy can be realized.

Stainless steel offers toughness in handling and is sufficiently heat and chemically resistant; however, it exhibits poor heat conductivity, on the order of 0.07 cal/deg C/sq cm/cm. Therefore, if the ash pan is of stainless steel and constructed for example as shown in U.S. Pat. No. 3,890,654, with both the inner and outer pans being of stainless steel, the raised center portion will actually inhibit the evaporation process because it shadows the bottom of the ash pan from the heater and, yet, does not conduct the heat gathered at its top portion. The resulting efficiency is greatly reduced. An ash pan similar to that shown in U.S. Pat. No. 3,890,654, with both the inner and outer pans formed of stainless steel and welded together with a dead space therebetween, has been used in the past.

Aluminum is ideal from standpoint of heat conductivity, being some 10 times more conductive than stainless steel. It is also relatively inexpensive and readily available. Aluminum of the grade for forming is not resistant to rough handling and easily deforms. It also has a low softening-point temperature.

SUMMARY OF THE INVENTION

It is an object of the invention to provide a composite ash pan for an incinerator type toilet comprising an outer pan formed of stainless steel and an inner pan, formed of aluminum, adapted to be removably inserted into the outer pan. The inner pan has a raised central portion for separating and supporting the solid waste from the liquid waste. The stainless steel outer pan provides the strength needed and the inner aluminum pan allows effective conduction of heat into the lower portion thereof not directly exposed to the radiant heat of the heater itself. In the preferred embodiment, the raised central portion extends up to a height about equal to that of the height of the surrounding wall of the inner pan.

BRIEF DESCRIPTION OF THE DRAWINGS

FIG. 2 is an exploded view of an incinerator chamber member of the toilet.

FIG. 3 is an exploded view of the electrical heating coil and its supporting brackets employed in the incinerator chamber member of FIGS. 1 and 2.

FIG. 5 is a side view of one of the brackets employed for securing the electrical coil within the incinerator chamber member.

FIG. 6 illustrates a slot formed in the inner wall of the incinerator chamber member in which the upper hook of the bracket of FIG. 5 may be inserted for holding the bracket in place.

DETAILED DESCRIPTION OF THE INVENTION

Figure 1:
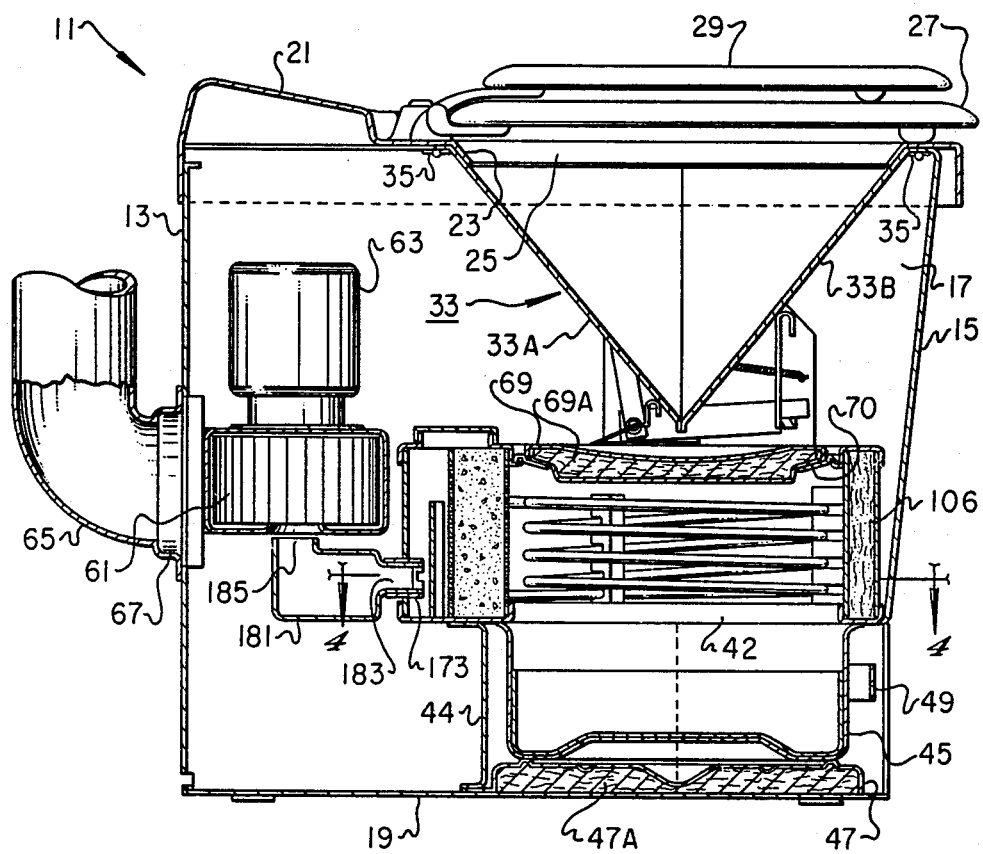
FIG. 1 is a cross sectional side view of a incinerator toilet in which is located the ash pan of the invention.
Figure 4:
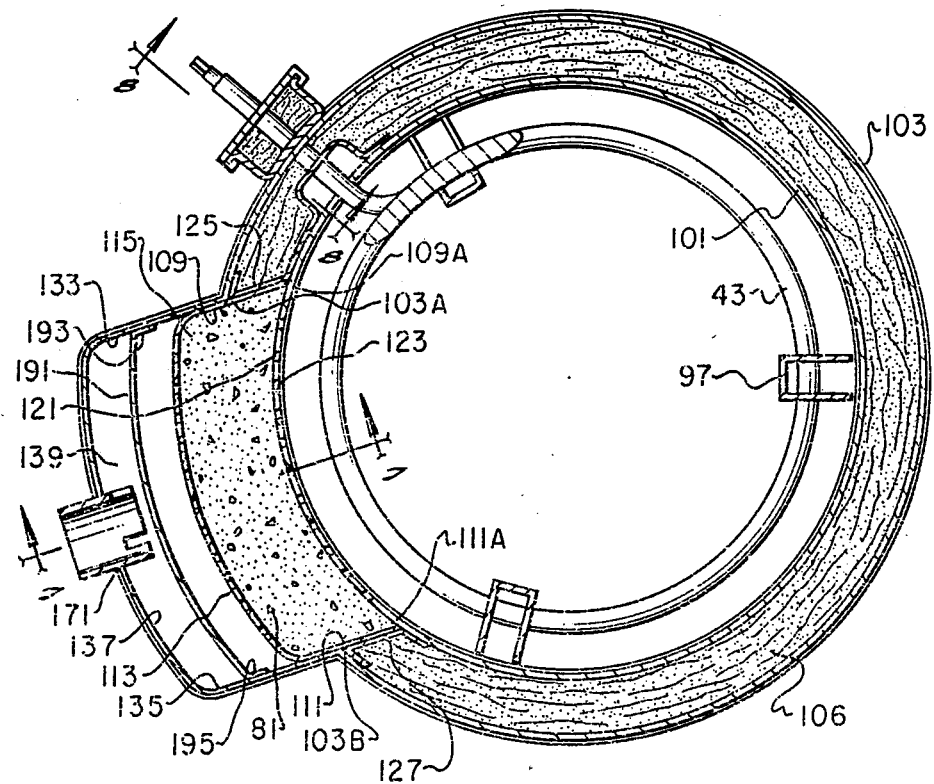
FIG. 4 is a cross section of FIG. 1 taken along the lines 4—4 thereof.
Figure 7:
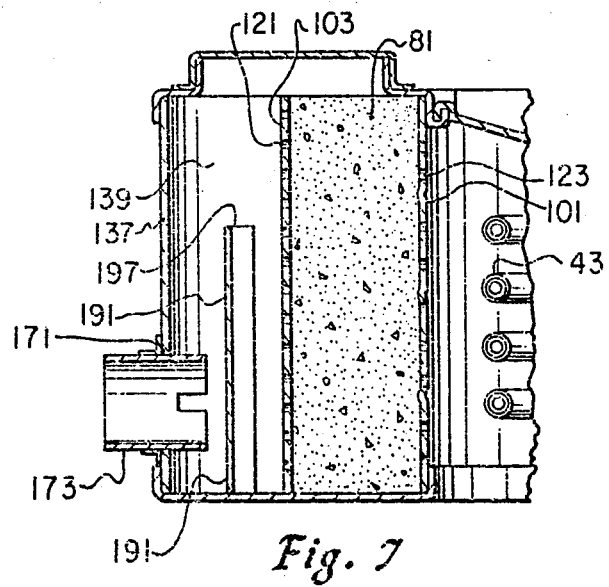
FIG. 7 is a cross sectional view of FIG. 4 taken along the lines 7—7 thereof.

Referring to FIG. 1, the incinerator toilet comprises a housing 11 formed by a rear wall 13, a front wall 15, two side walls, one of which is identified at 17, a bottom wall 19, and a top 21. The front, rear, sides, and bottom walls and the top 21 are preferrably formed of mild steel. The forward portion of the top 21 includes a recessed upper bowl portion 23 forming an upper opening 25 which extends downward from the top 21. Located above and around the bowl 23 is a hinged seat 27 adapted to be located in the position shown or moved to an upward position. A hinged lid 29 is adapted to fit over the seat 27. The lid 29 also may be moved to an upward position independently of the seat. The seat 27 and the lid 29 are hinged to the top 21 by way of a hinge arrangement illustrated at 31. A lower bowl portion 33 is located below the upper bowl portion 23 and is transversely divided into two halves 33A and 33B which are pivotally mounted to the underside of the top 21 by way of hinges 35. When the toilet is being used, the halves 33A and 33B will be in their closed position whereby a cone-shaped paper insert may be located within the lower bowl portion 33.

The incinerator toilet comprises an open ended incinerator chamber member 41 located below the bowl and which has a circular electrical heating coil 43 located in its central opening 42. The chamber member 41 is mounted on a semi-circular metal support 44. An ash pan 45 is slideably mounted on a metal step support 47 formed on the housing bottom 19 within the chamber support 44 and below the central opening 42 of the chamber member 41. Heat insulation materials 47A is located between the support 47 and the bottom 19. The ash pan 45 has a handle 49 on its front side which is accessible by means of a removable pannel (not shown) but which will be located below the front wall 15. A blower wheel 61 and a motor 63 are provided for drawing gases from the interior of the chamber 41 and the pan 45 and then through a heat activated odor reducing catalyst 81 and then out of a rear vent 65 which is connected to the rear wall 13 of the housing by way of a collar 67. An incinerator chamber lid 69, which fits into a recessed seat 70 formed at the upper end of the chamber 41, is provided for closing the upper end of the chamber 41 while the heater coil 43 is being energized for disposing of the waste received in the pan 45. The outer walls of the lid 69 are formed of stainless steel with heat insulation material 69A located within the walls.

When the incinerator toilet is being used by a person, the lower bowl halves 33A and 33B will be located in their closed position as shown in FIG. 1 and a cone-shaped paper insert located within the lower bowl portion 33. When it is desired to deposit the waste in the paper cone within the pan 45, the chamber lid 69 will raised upward and out of its recessed seat and then swung to the side and out of the way to allow the hinged halves 33A and 33B to swing open to allow the paper cone and the waste to drop through the central opening 42 of the chamber 41 and into the pan 45. A linkage mechanism controlled by a foot pedal suitable for allowing the bowl halves 33A and 33B and the chamber lid 69 to operate in this manner is disclosed in my U.S. Pat. No. 3,890,653, granted on June 24, 1975, and entitled "Incinerator Toilet Having a Vertically Movable Incinerator Chamber Lid". After the paper cone and waste have been deposited in the pan 45, the foot pedal again will be actuated to return the chamber lid 69 to its closed position and to return the bowl halves 33A and 33B to their closed positions. A switch then may be actuated to complete a circuit to the electrical coil 43 and to the blower motor 63. A timer is set thereby causing the heater and exhaust blower to come into operation, staying on until the incinerator process and cooling process are completed. Gases from the chamber 41 are drawn through the heat activated catalyst 81 for reducing the odor and then through the ventline 65. Residual ash is collected in the removable ash pan 45. Suitable electrical circuits for electrically controlling the coil 43 and the blower motor 63 are disclosed in U.S. Pat. No. 3,020,559, granted on Feb. 13, 1962, and U.S. Pat. No. 3,251,070, granted on May 17, 1966.

Referring now to FIGS. 1, 2, 4, and 7, the incinerator chamber member 41 is formed by a cylindrical shaped inner side wall 101 and a partially cylindrical shaped outer side wall 103 spaced from and partially surrounding the inner side wall 101 forming a partially annular heat insulation holding space 105 therebetween. The heat insulation is illustrated at 106 in FIGS. 1 and 4. A U-shaped outer catalyst chamber side wall 107 is coupled to the inner wall 101 and to the outer wall 103 for forming a catalyst chamber or container 109. The U-shaped member 107 has two legs 109 and 111 and an arcuate portion 113 having a radius greater than the radius of the wall 103. The edges 109A and 111B of the legs 109 and 111 are connected to the outer surface of the cylindrical member 101 and the outer sides of the legs 109 and 111 are connected to the edges 103A and 103B of the partially cylindrical shaped member 103 with the arcuate portion 113 extending outward beyond the outer wall 103 on one side of the diameter of the wall 103 forming a catalyst chamber 115 for receiving a heat activated odor reducing catalyst 81. Perforations 121 are formed through the arcuate portion 113 of the U-shaped member 107 and perforations 123 are formed through the cylindrical shaped inner wall 101 between the edges 109A and 111B of the legs of the U-shaped member 107. U-shaped brackets 125 and 127 are secured against the outside of the legs 109 and 111 and to the outside and the inside of the wall members 101 and 103 whereby the heat insulation chamber 105 and the catalyst chamber 107 are separated from each other. A second U-shaped wall member 131 having legs 133 and 135 and an arcuate shaped portion 137 is provided with the legs 133 and 135 being located against the outward portions of the legs 109 and 111 and with their edges 133A and 135A secured to the edges 103A and 103B of the outer wall member 103 such that the outer portion of the U-shaped member 131 including the arcuate shaped wall portion 137 extends outward of the wall portion 137 forming a collection chamber 139.

A top wall 141 comprising an annular wall portion 143 and an outward extending portion 145 is coupled to the upper ends of the wall members 101 and 103 and 107 and 131 and a bottom wall 151 comprising an annular wall portion 153 and an outward extending portion 155 is coupled to the lower ends of the wall members 101 and 103 and 107 and 131 to effectively seal the heat insulation chamber 105 from the catalyst chamber 115 and the collection chamber 139 and all of the chambers 105, 115, and 139 from the atmosphere. The outward extending portion 145 of the top wall 141 has an aperture 161 formed therethrough with a vertical wall 163 extending around the aperture and upward from the top portion of the wall portion 145 such that the aperture 161 is in fluid communication with both the catalyst chamber 115 and the collection chamber 139. A removable lid 165 is adapted to fit over the wall 163 and hence over the opening 161 and to be secured to the top wall 141 with bolts 167.

An exhaust port or opening 171 is formed through the wall portion 173 of the U-shaped member 131 at its lower end midway between its side walls 133 and 135. An exhaust tube 173 is located in the aperture 171 and an outlet chamber 181 has an inlet tube 183 located in the tube 173 and an outlet 185 located below the blower 161. A U-shaped baffle 191 has its lower end 193 secured and sealed to the inside of the outward extending portion 155 of the bottom wall 151 and its side legs 193 and 195 secured to the inside of the legs 133 and 135 of the U-shaped member 131. The top 197 of the baffle 191 is lower than the top wall 141 of the chamber member and above the exhaust port 171, 173. Thus, when the blower is operating, the gases from inside of the chamber member 41 and the ash pan 45 pass through the perforations 123, through the heat activated catalyst 81, through the perforations 121, above the top edge 197 of the baffle 191 through the exhaust port 171, 173 and into and through the exhaust chamber 181 by way of its inlet 183 and outlet 185 and then by way of the blower 161 through the exhaust vent 65.

The perforated section of the inner wall 101 has an arc length of about six inches and a height of about three and one-half inches. The height of the arcuate portion 113 also is about three and one-half inches. The distance between the perforated section of the cylindrical wall 101 and the arcuate portion 113 is about two inches such that the catalyst chamber has a total volume of about forty cubic inches. The collection chamber has a thickness from wall 113 to wall 137 is about one and one-quarter inches with an areal extent of six by four or twenty four square inches, having been reduced from ten by four or forty square inches of the earlier versions. Thus, the pressure distribution across the outer face of the perforated catalyst chamber is more nearly equalized because of the greater thickness and smaller area of the catalyst chamber. The catalyst is easily added through the port or opening 161 by removing the cap 163. Alternatively, old or deteriorated catalyst can be vacuumed out through the opening 161 which has dimensions of about one and one-quarter of an inch by four inches which is adequate for the nozzle of the ordinary home vacuum. Dust from the powdered catalyst generally accumulates in the lower portion of the catalyst chamber or container and is carried into the collection chamber along its lower level. The metal plate or baffle 191 is located midway between the walls 113 and 137 of the collection chamber and extends upward to a position about two thirds of the height of the collection chamber. The baffle 191 is sealed to the bottom 155 of the collection chamber. The baffle 191 thus causes dust to drop out and to be collected in the bottom in front of the baffle whereby the dust is prevented from entering the blower and depositing on the blower impeller. The collected dust can be vacuumed out from time to time.

Only a small portion of air drawn into the toilet goes into the incinerator number—only enough to permit complete incineration of the waste. Approximately ninty-five percent of the intake air traverses the space about the incinerator chamber thereby carrying away heat from the exterior incinerator wall.

Figure 9:
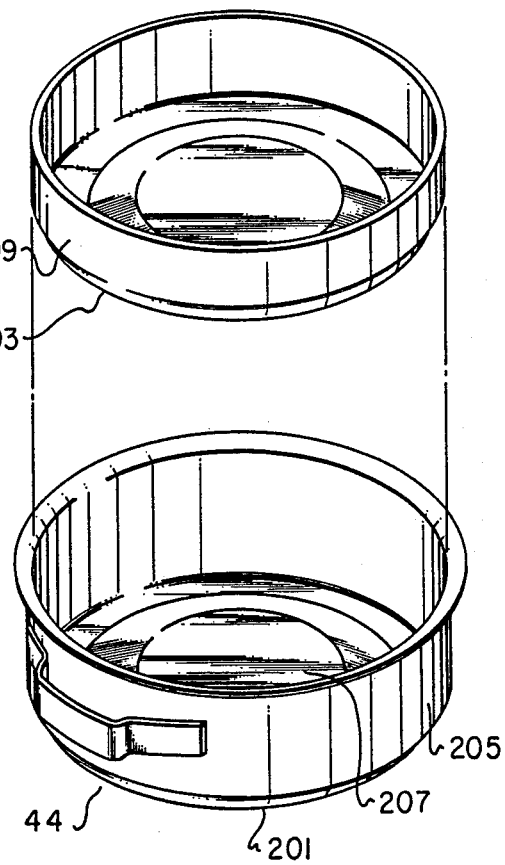
FIG. 9 is an exploded view of one embodiment of the ash pan of the invention employed in the toilet of FIG. 1.
Figure 10:
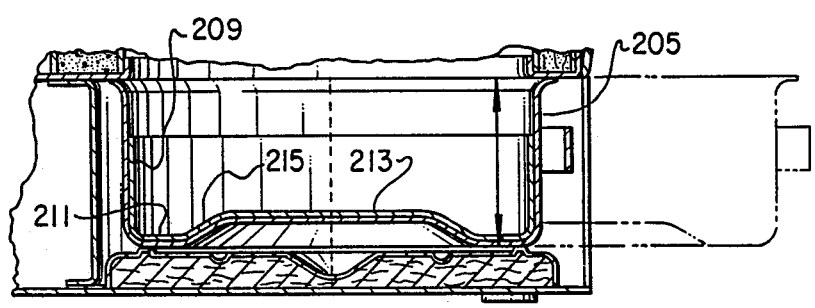
FIG. 10 is a partial cross sectional side view of the toilet of FIG. 1 illustrating that the ash pan is removable.

Referring to FIGS. 9 and 10, the ash pan 44 is a composite ash pan formed by an outer pan 201 of stainless steel and an inner or insert pan 203 of aluminum which is removably inserted within the outer pan 201. The pan 44 is readily removed for empting or replacement when needed at an inconsequential cost because of its similicity of manufacture. The center portion of the inner pan 203 may be raised to close proximity to the heater 43 and yet readily conducts gathered heat to its lower portion for increased rate of evaporation of liquids accumulated in the bottom portion. In otherwords, the aluminum conducts heat into a portion not directly exposed to the radiant heat of the heater 43 itself. The outer pan 201 comprises an outer annular side wall 205 and a bottom wall 207. The inner pan 203 comprises an annular surrounding side wall 209, an annular lower wall portion 211 extending inwardly from the lower end of the annular surrounding side wall 209, and a raised portion 213 spaced inwardly of the annular surrounding side wall 209. The raised central portion comprises an annular inner side wall 215 extending upwardly from the annular lower wall portion 211 such that the annular inner side wall 215 is spaced from the annular surrounding side wall 209 with the raised portion 213 forming an upper platform connected to the upper end of the annular inner side wall 215. In the embodiment of FIGS. 9 and 10, the lower portion of the outer pan 201 is shaped similar to the lower portion of the inner pan 203 whereby the lower portion of the inner surface of the outer pan 201 and the outer surface of the inner pan 203 engage each other when the inner pan is inserted in the outer pan.

Figure 11:
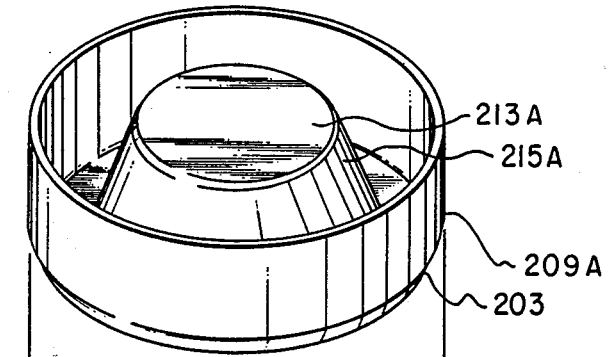
FIG. 11 is an exploded view of another embodiment of the ash pan of the invention.
Figure 12:
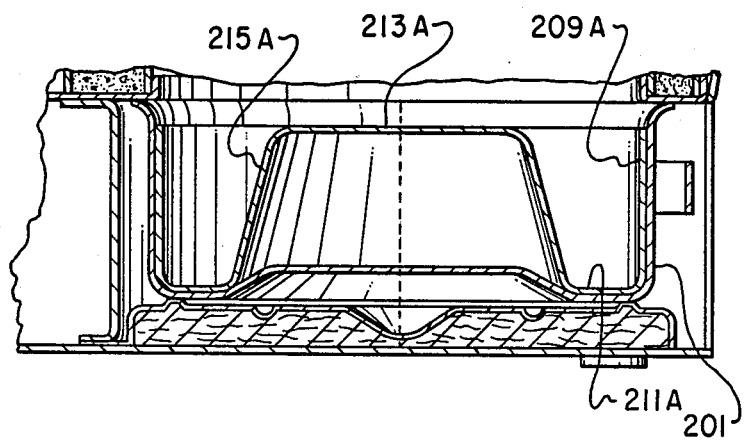
FIG. 12 is a partial cross sectional side view of the toilet of FIG. 1 illustrating the removable ash pan of FIG. 11 located therein.

Referring to FIGS. 11 and 12, the outer pan 201 is the same as that of the outer pan of FIGS. 9 and 10. The inner pan 203 is modified in that its annular wall 209A is higher and the annular inner wall 215 is higher such that the upper wall 213A extends upward to about the same height as the upper edge of the wall 209A and both the upper wall 213 and the upper edge of the surrounding wall 209A extend to nearly the height of the upper edge of the outer pan 201. The outer surfaces of the walls 215A and 213A do not engage the bottom of the outer pan 201 and are spaced therefrom as shown in FIG. 12. In the embodiment of FIGS. 11 and 12, the platform 213A is raised substantially above the lower portion 211 of the inner pan whereby the solid portion of the human waste is separated from the liquid portion with the solid portion being deposited on the platform 213A and the liquid portion flowing to the lower portion 211A. Thus, the solids deposited on the platform 213A are maintained closer to the heater thereby decreasing the time of incineration and increasing the efficiency and lowering the amount of energy required. The liquids in the bottom portion 211A evaporate rapidly since the aluminum conducts heat into the lower portion 211A which may not be directly exposed to the radiant heat of the heater itself. Since the net or effective volume of the composite pan is reduced by virtue of the raised portion 215A and 213A, the height of the wall 209A is made approximately the same as that of the raised portion 215A and 213A to effectively increase the volume of the inner pan 203.

In one embodiment, the outer pan 201 is formed of 304 stainless steel. Pan 201 has a height of four inches and the outside diameter of wall 205 is ten inches. The wall thickness of pan 201 is 0.062 of an inch. The inner pan 203 is formed of a drawable aluminum such as 3003H14 aluminum. The wall thickness of the pan 203 is 0.125 of an inch. It is to be understood that the pans 201 and 203 may have different dimensions and formed of different variations of stainless steel and aluminum respectively.

Referring to FIGS. 3, 5, and 6, the arrangement for supporting the electrical heater coil 43 within the chamber 41 comprises three removable brackets 197 having hooks 197A formed at their upper ends. The brackets 197 have slots 197B adapted to receive the turns of the heater coil 43. The hook 197A of the brackets are inserted in slots 199 formed in the inside wall of the cylindrical member 101 for securing the brackets to the inside of the wall 101 while holding and supporting the electrical coil 43. The brackets 197 can be removed from the inner wall 101 to allow the coil 43 to be removed therefrom.

Figure 8:
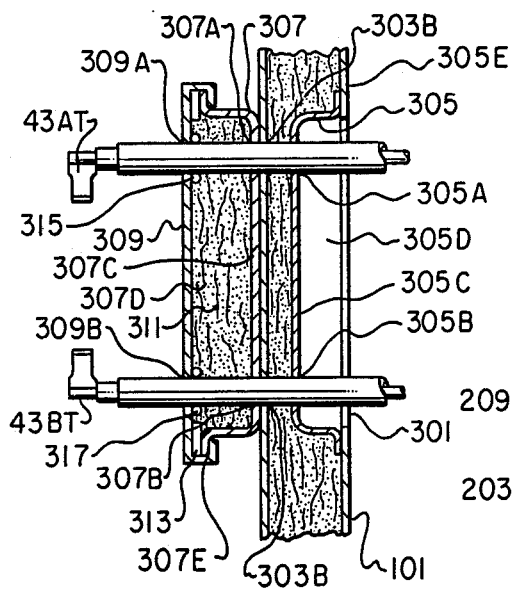
FIG. 8 is a cross sectional view of FIG. 4 taken along the lines 8—8 thereof.

The coil 43 has two terminal ends 43A and 43B. Reffering specifically to FIGS. 2 and 8 there will now be described an arrangement for facilitating the insertion of the terminal ends of the coil 43 through the inner and outer walls of the chamber 41 thereby facilitating removal and replacement of the coil for servicing. The terminal ends 43A and 43B have tabs 43AT and 43DT which are removed when the terminal ends are being inserted or removed from the chamber 41. A large rectangular shaped aperture 301 is formed through the inner wall 101 and two spaced apertures 303A and 303B are formed through the outer wall 103 on one side of the catalyst chamber as shown in FIG. 2. When the inner and outer members 101 and 103 are assembled, the apertures 303A and 303B will be in alignment with the large aperture 301. Also provided is an inner cup shaped member or pan 305 and an outer cup shaped member or pan 307. Member 305 has two small apertures 305A and 305B formed in its back end 305C and a large opening 305D surrounded by a flange 305E. The flange 305E is welded to the outer surface of the wall 101 such that the apertures 305A and 305B are in alignment with the apertures 303A and 303B respectively and such that the opening 305D is in alignment with the opening 301. Pan 307 also has two small apertures 307A and 307B formed in its back end 307C and a large opening 307D formed in its front end and surrounded by a flange 307E. Opening 307D is adapted to be closed by a lid 309 which may be attached to the flange 307E as shown in FIG. 8. The back end 307C is welded to the outside surface of the outer wall 103 such that apertures 307A and 307B are in alignment with apertures 303A and 303B. The lid 309 has a pair of small apertures 309A and 309B for receiving the terminal ends 43A and 43B of the coil. Located within the pan 307 is heat insulation material 311 which may be hair-like mineral wool.

When assembling the heater coil in place, the lid 109 will be removed. The heater coil then will be located within the slots 197B of the brackets 197 such that the brackets 197 are located 120° apart. The coil and the brackets then will be tilted as the assembly is inserted in the interior of the chamber 41 to allow the terminal ends 43A and 43B to be inserted through the large aperture 301; through the smaller apertures 305A, 303A, 305B, and 303B, 307A, 307B; and then out through the large opening 307D of the pan 307. The heat insulation 311 then may be inserted within the pan 307 and packed around the terminal ends after which the lid 309 may be inserted in place. Suitable heat resistant flexbile seals 313, 317, 315, and 317 may be provided to insure minimum of heat loss through the sealing pan 307.

In one embodiment, the walls 101, 103, 107, 131, and 137 and 151 and 141 of the chamber 41 may be formed of suitable mild steel. The heat activated catalyst 81 may be aluminum oxide ($Al_2O_3$) pellets although it is to be understood that other types of heat activated catalyst may be used or mixed with the aluminum oxide. The heat insulation material 106 located in the chamber 105 may be mineral wool.

I claim:

1. In an incinerator toilet having an incinerator chamber comprising a chamber means with an opening formed therethrough, heating means located in said opening of said chamber means, and a removable ash pan located below said chamber means, said ash pan comprising:

an outer pan formed of stainless steel and comprising an outer annular side wall with a bottom wall and, an inner pan formed of aluminum adapted to be removably inserted into said outer pan, said inner pan being separate from said outer pan, said inner pan comprising an annular surrounding side wall, an annular lower wall portion extending inwardly from the lower end of said annular surrounding side wall and a raised central portion spaced inwardly of said annular surrounding side wall, said raised central portion comprising an annular inner side wall having a lower end extending upwardly from said annular lower wall portion such that said annular inner side wall is spaced from said annular surrounding side wall and a central upper wall forming an upper platform connected to the upper end of said annular inner side wall, the outside surface of said annular surrounding side wall of said inner pan being adapted to engage the inside surface of said outer annular side wall of said outer pan when said inner pan is inserted into said outer pan, the outside surface of said annular lower wall portion of said inner pan being adapted to engage at least a portion of the bottom wall of said outer pan next to its outer annular side wall when said inner pan is inserted into said outer pan.

2. In an incinerator toilet having an incinerator chamber comprising a chamber means with an opening formed therethrough, heating means located in said opening of said chamber means, and a removable ash pan located below said chamber means, said ash pan comprising:

an outer pan formed of stainless steel and comprising an outer annular side wall with a bottom wall and, an inner pan formed of aluminum adapted to be removable inserted into said outer pan, said inner pan being separate from said outer pan, said inner pan comprising an annular surrounding side wall, an annular lower wall portion extending inwardly from the lower end of said annular surrounding side wall and a raised central portion spaced inwardly of said annular surrounding side wall, said raised central portion comprising an annular inner side wall having a lower end extending upwardly from said annular lower wall portion such that said annular inner side wall is spaced from said annular surrounding side wall and a central upper wall forming an upper platform connected to the upper end of said annular inner side wall, the outside surface of said annular surrounding side wall of said inner pan being adapted to engage the inside surface of said outer annular side wall of said outer pan when said inner pan is inserted into said outer pan, the outside surface of said annular lower wall portion of said inner pan being adapted to engage at least a portion of the bottom wall of said outer pan next to its outer annular side wall when said inner pan is inserted into said outer pan, the height of said annular surrounding side wall of said inner pan being greater than one half of the height of said outer annular side wall of said outer pan such that when said inner pan is inserted into said outer pan, the upper end of said annular surrounding side wall of said inner pan extends upward to a position near the upper end of said outer annular side wall of said outer pan, the height of said raised portion of said inner pan being about the same as the height of said annular surrounding side wall of said inner pan relative to said annular lower wall portion.

3. The apparatus of claim 1, wherein:

the upper end of said annular surrounding side wall of said inner pan is located below the upper end of said outer annular side wall of said outer pan when said inner pan is inserted into said outer pan.

4. The apparatus of claim 2, wherein:

the upper end of said annular surrounding side wall of said inner pan is located below the upper end of said outer annular side wall of said outer pan when said inner pan is inserted into said outer pan.

5. In an incinerator toilet having an incinerator chamber comprising a chamber means with an opening formed therethrough, heating means located in said opening of said chamber means, and a removable ash pan located below said chamber means, said ash pan comprising:

an outer pan formed of stainless steel and comprising an outer annular side wall with a bottom wall and, an inner pan formed of aluminum adapted to be removably inserted into said outer pan, said inner pan being separate from said outer pan, said inner pan comprising an annular surrounding side wall, an annular lower wall portion extending inwardly from the lower end of said annular surrounding side wall and a raised central portion spaced inwardly of said annular surrounding side wall;

said raised central portion comprising an annular inner side wall having a lower end extending upwardly from said annular lower wall portion such that said annular inner side wall is spaced from said annular surrounding side wall and a central upper wall forming an upper platform connected to the upper end of said annular inner side wall, the outside surface of said annular lower wall portion of said inner pan being adapted to engage at least a portion of the bottom wall of said outer pan when said inner pan is inserted into said outer pan, the upper end of said annular surrounding side wall of said inner pan being located below the upper end of said outer annular side wall of said outer pan when said inner pan is inserted into said outer pan.

6. In an incinerator toilet having an incinerator chamber comprising a chamber means with an opening formed therethrough, heating means located in said opening of said chamber means, and a removable ash pan located below said chamber means, said ash pan comprising:

an outer pan formed of stainless steel and comprising an outer annular side wall with a bottom wall and, an inner pan formed of aluminum adapted to be removably inserted into said outer pan, said inner pan comprising an annular surrounding side wall, an annular lower wall portion extending inwardly from the lower end of said annular surrounding side wall and a raised central portion spaced inwardly of said annular surrounding side wall, said raised central portion comprising an annular inner side wall having a lower end extending upwardly from said annular lower wall portion such that said annular inner side wall is spaced from said annular surrounding side wall and a central upper wall forming an upper platform connected to the upper end of said annular inner side wall, the outside surface of said annular lower wall portion of said inner pan being adapted to engage at least a portion of the bottom wall of said outer pan when said inner pan is inserted into said outer pan, the height of said annular surrounding side wall of said inner pan being greater than one half of the height of said outer annular side wall of said outer pan such that when said inner pan is inserted into said outer pan, the upper end of said annular surrounding side wall of said inner pan extends upward to a position near but below the upper end of said outer annular side wall of said outer pan, the height of said raised portion of said inner pan being about the same as the height of said annular surrounding side wall of said inner pan relative to said annular lower wall portion.

* * * * *